(12) United States Patent
Gracik et al.

(10) Patent No.: US 7,284,570 B1
(45) Date of Patent: Oct. 23, 2007

(54) ELECTRICALLY POWERED VALVE FOR CONTROLLING, MONITORING AND EVALUATING FLUID FLOW

(75) Inventors: Thomas D. Gracik, Glen Burnie, MD (US); Andrew J. Field, Rockville, MD (US); William D. Kuran, Potomac, MD (US); Frederick Oberman, Herndon, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 64 days.

(21) Appl. No.: 11/076,104

(22) Filed: Feb. 16, 2005

(51) Int. Cl.
*F17D 5/02* (2006.01)
(52) U.S. Cl. .................. 137/554; 251/129.03
(58) Field of Classification Search ............... 137/554; 251/129.03
See application file for complete search history.

(56) References Cited

U.S. PATENT DOCUMENTS

| | | | |
|---|---|---|---|
| 3,390,943 A * | 7/1968 | Myers ..................... | 431/78 |
| 4,286,768 A * | 9/1981 | Fiedler, Jr. ............. | 251/129.03 |
| 4,544,128 A * | 10/1985 | Kolchinsky et al. ... | 251/129.03 |
| 4,700,742 A | 10/1987 | Rosaen | |
| 4,877,059 A * | 10/1989 | Popescu et al. ........ | 137/554 |
| 4,932,205 A | 6/1990 | Alderfer et al. | |
| 5,193,780 A * | 3/1993 | Franklin ................. | 137/554 |
| 5,404,903 A | 4/1995 | Anderson et al. | |
| 5,433,244 A * | 7/1995 | Sule ....................... | 137/554 |
| 5,529,281 A * | 6/1996 | Brudnicki et al. ..... | 251/129.03 |
| 5,975,106 A * | 11/1999 | Morgan et al. ......... | 137/78.5 |
| 6,176,247 B1 | 1/2001 | Winchcomb et al. | |
| 6,189,520 B1 | 2/2001 | Cook et al. | |
| 6,199,629 B1 | 3/2001 | Shirk et al. | |
| 6,202,668 B1 | 3/2001 | Maki | |
| 6,209,576 B1 | 4/2001 | Davis | |
| 6,213,147 B1 | 4/2001 | Gramann et al. | |
| 6,227,223 B1 | 5/2001 | Crochet et al. | |
| 6,250,327 B1 | 6/2001 | Freigang et al. | |
| 6,260,531 B1 | 7/2001 | Haan et al. | |
| 6,276,200 B1 | 8/2001 | Cazden | |
| 6,276,331 B1 | 8/2001 | Machida et al. | |
| 6,302,374 B1 | 10/2001 | Fink | |
| 6,371,440 B1 * | 4/2002 | Genga et al. .......... | 251/129.03 |
| 6,401,743 B1 * | 6/2002 | Naedler .................. | 137/224 |
| 6,437,533 B1 | 8/2002 | Du et al. | |
| 6,437,555 B1 | 8/2002 | Pioch et al. | |
| 6,526,864 B2 | 3/2003 | Lindler et al. | |
| 6,540,442 B1 | 4/2003 | Slattery et al. | |
| 6,592,099 B2 | 7/2003 | Yamamoto et al. | |
| 2002/0157713 A1 | 10/2002 | Pimouguet | |

\* cited by examiner

*Primary Examiner*—Eric Keasel
*Assistant Examiner*—Cloud Lee
(74) *Attorney, Agent, or Firm*—Jacob Shuster; Dave A. Ghatt

(57) ABSTRACT

Controlled flow of liquid is conducted between aligned inlet and outlet pipe sections through a valve housing within which a solid valve element is sealed and supported for electrically powered displacement between a fully open position establishing unrestricted flow and a fully closed position blocking inflow from the inlet pipe section and outflow from the outlet pipe section. The valve element is operatively displaced either by rotation or by linear movement under electrically powered control through a valve stem connected thereto, while a manual actuator is also connected to the valve stem outside of the valve housing for imparting reduced dithering displacement to the valve element so as to insure that it is in proper and readied working condition. Such electrically powered operational displacement of the valve element is sensed in response to movement of the valve stem.

5 Claims, 3 Drawing Sheets

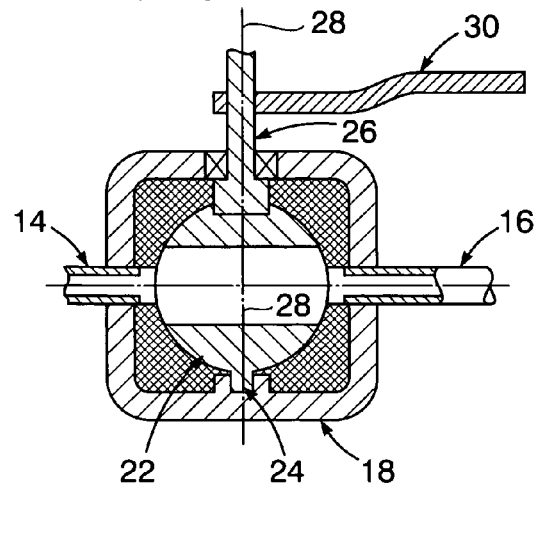
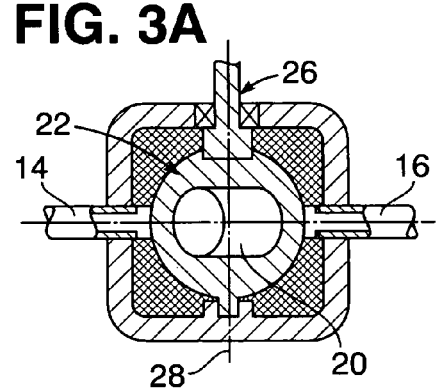
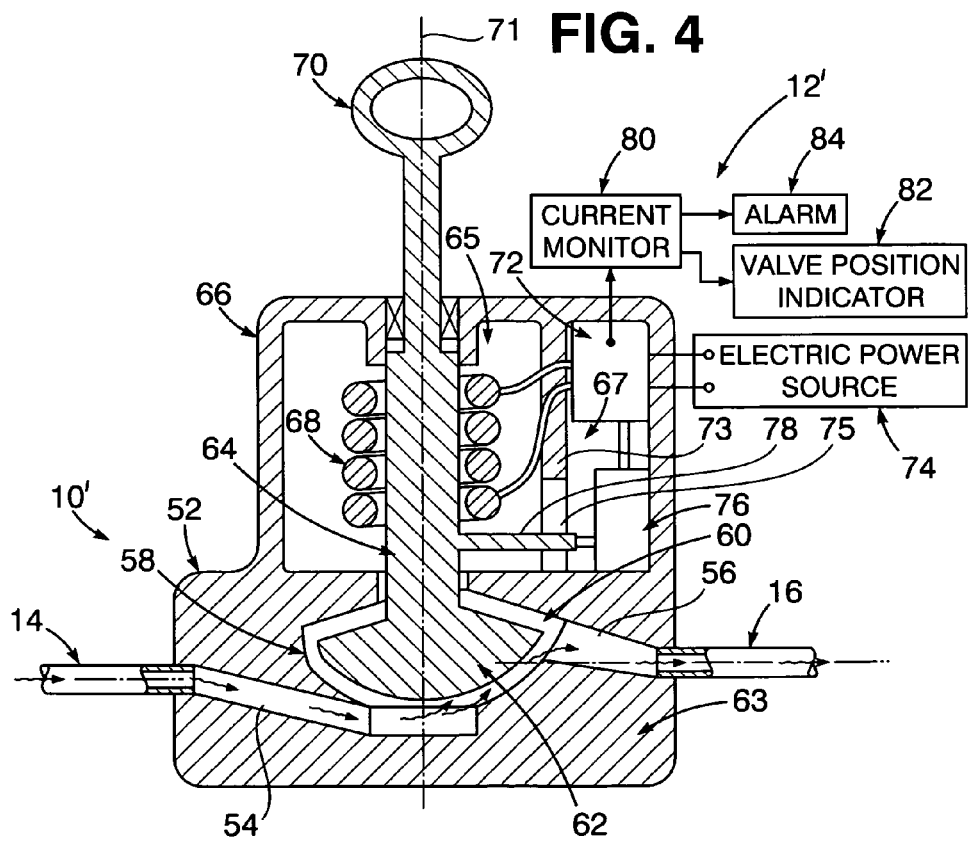

US 7,284,570 B1

ELECTRICALLY POWERED VALVE FOR CONTROLLING, MONITORING AND EVALUATING FLUID FLOW

The present invention relates generally to a valve assembly constructed and arranged to facilitate control, monitoring and evaluation of fluid flow between pipe sections.

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION

There are valve installations located on board sea vessels, associated for example with fuel storage systems, involving a large number of valves. Because of problems that repeatedly arise with respect to the operation and readiness status of such valves and the inability of monitoring systems, such as those disclosed in U.S. Pat. Nos. 6,176,247B1, 6,189,520B1, 6,199,629B1, 6,227,223B1 and 6,592,099B2 to continuously evaluate and provide data on valve operational malfunctions, time consuming valve inspection and testing by personnel becomes necessary. It is therefore an important object of the present invention to provide an advantageous arrangement for such valves so as to facilitate operational monitoring thereof and reduce the personnel problems heretofore associated therewith.

SUMMARY OF THE INVENTION

Pursuant to the present invention, certain operational arrangements are prescribed for electrically powered valves to facilitate continuous monitoring and operational evaluation thereof for immediate detection of malfunctioning so that corrective measures may be promptly taken. Toward that end, each of the valve arrangements involves a valve housing through which fluid flow is conducted between aligned inlet and outlet pipe sections. A solid valve element is sealed and guidingly supported within the valve housing for electrically powered displacement between a fully open position, accommodating unrestricted fluid flow between the inlet and outlet pipe section, and a fully closed position blocking outflow through the outlet pipe section. Such displacement of the valve element is effected under electrically powered drive means and sensed through a valve stem having a displacement axis extending therethrough in perpendicular intersecting relation to flow through the valve housing between the inlet and outlet pipe sections. A manual override actuator is connected to the valve stem outside of the valve housing for imparting dithering displacement to the valve element by a reduced extent so as to ensure the valve is in an operational readiness condition.

According to one embodiment of the present invention, the valve element is of a spherical ball shape type guidingly mounted within the valve housing for rotation about the displacement axis. A flow passage is formed within the valve element for positioning thereof only in the fully open position to unrestrictively conduct the fluid flow between the inlet and outlet pipe sections. According to another embodiment, the valve element is displaced along the stem axis to the fully closed position by electrical energy applied to an electromagnetic drive coil positioned on the valve stem. In such fully closed position the valve element is seated on a surface formed within the valve housing to thereby block fluid flow between the inlet and outlet pipe sections.

BRIEF DESCRIPTION OF THE DRAWING FIGURES

A more complete appreciation of the invention and many of its attendant advantages will be readily appreciated as the same becomes better understood by reference to the following detailed description when considered in connection with the accompanying drawing wherein:

FIG. 3 is a section view taken substantially through a plane indicated by section line 3-3 in FIG. 2, showing the valve assembly in fully open condition;

FIG. 3A is a section view corresponding to that of FIG. 3, showing the valve assembly in a fully closed condition;

FIG. 4 is a section view through a valve assembly arrangement pursuant to another embodiment of the present invention, with attached components of an associated electrically powered system diagrammatically illustrated;

DETAILED DESCRIPTION OF PREFERRED EMBODIMENT

Figure 1:
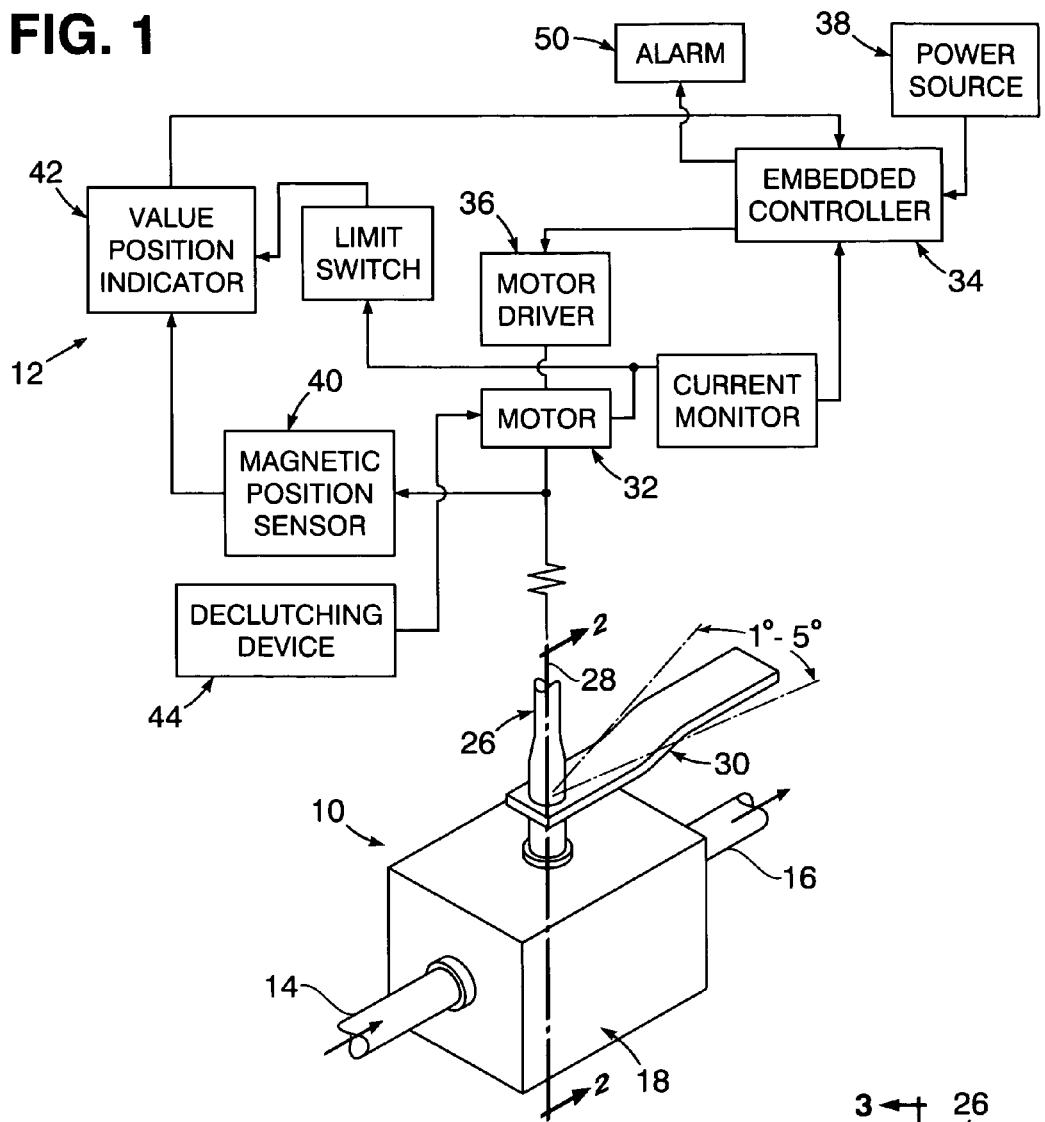
FIG. 1 illustrates a valve assembly arrangement between aligned pipe sections in accordance with one embodiment of the present invention, with an electrically powered system diagrammatically shown connected hereto.
Figure 2:
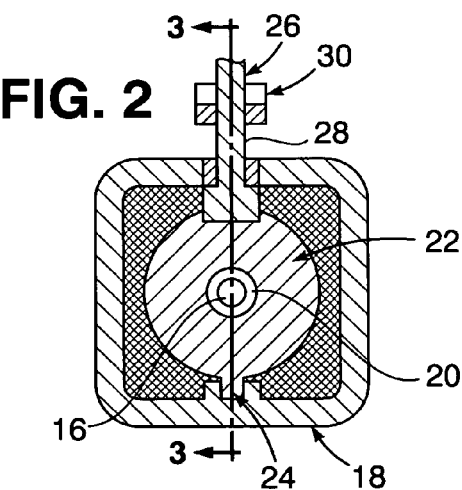
FIG. 2 is a section view taken substantially through a plane indicated by section line 2-2 in FIG. 1.

Referring now to the drawing in detail, FIGS. 1, 2, 3 and 3A illustrate one embodiment of a fluid flow controlling valve assembly 10 located within a sea vessel for example in association with a diagrammatically illustrated electrically powered system 12 through which the valve assembly 10 controls flow of fluid such as seawater between inlet and outlet pipe sections 14 and 16 positioned in axial alignment with each other. The pipe sections 14 and 16 extend into and out of a valve housing 18 of the valve assembly 10. A flow-through passageway 20 is formed within a spherical shaped ball valve element 22 positioned in a fully open position within the valve housing 18 as shown in FIG. 3. The valve passageway 20 is 20% cross-sectionally larger than the aligned passageways in the pipe sections 14 and 16 to avoid any flow restriction therebetween. The ball valve element 22 is rotatably mounted by a pivot formation 24 within the housing 18 in axial alignment with a valve stem 26 fixed to the ball valve element 22 so as to accommodate its maximized angular displacement by rotation about an axis 28 perpendicular to the passageway 20. The passageway 20 is positioned by the valve element 22 in a fully open position as shown in FIG. 3 and in a fully closed position as shown in FIG. 3A blocking inflow and outflow through the pipe sections 14 and 16. Furthermore, the ball valve element 22 is manually displaced about the axis 28 by a reduced dithering amount, such as one to five degrees, by an override actuator 30 fixed to the valve stem 26 closely spaced above the valve housing 18, whereby dithering displacement ensures when required that the valve assembly 10 and the powered valve operating system 12 are in proper working order.

As diagrammed in FIG. 1, the valve stem 26 is connected to an electric motor 32 associated with the system 12, under control of a controller 34 through a motor driver 36 connected to an electrical power source 38. The valve stem 26 is also operatively connected through a magnetic position sensor 40 to a valve position indicator 42. Powered drive of the valve assembly 10 by the motor 32 may be interrupted by a declutching device 44 when negative operational evaluation is indicated as reflected by signal detection from the position indicator 42. Regulation over powered valve operation is established by operational interconnection of a motor current monitor 46 and a limit switch 48 between the valve position indicator 42 and the controller 34. An audible or visual maintenance alarm device 50 is connected to the controller 34 so as to signify malfunction, reflected either by no valve displacement or valve motion deterrence signified by an increase in current.

Figure 4A:
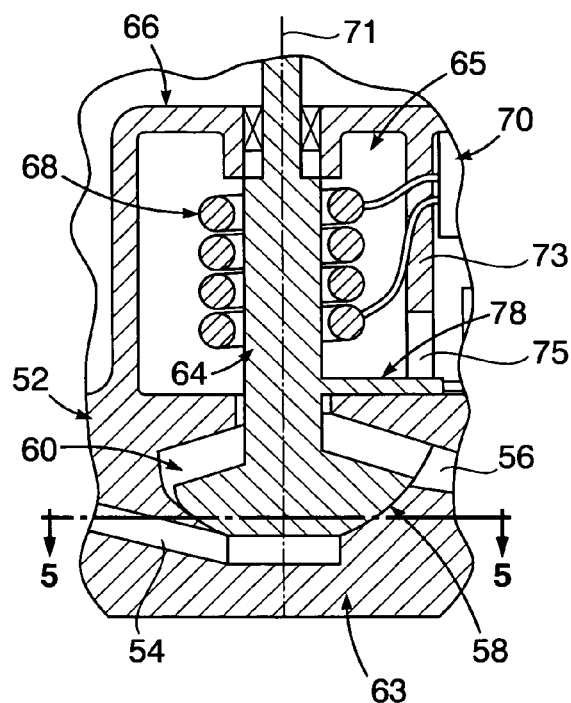
FIG. 4A is a partial section view corresponding to that of FIG. 4, showing the valve assembly in a fully closed condition.

According to another embodiment of the present invention as shown in FIG. 4, the aligned inlet and outlet pipe sections 14 and 16 extend into a valve housing 52 associated with a valve assembly 10' with which an electrically powered system 12' is associated. The inlet and outlet pipe sections 14 and 16 extend through a conduit section 63 of the valve housing 52 at the base of the housing. The valve housing also includes a primary chamber 65 and a secondary chamber 67. The primary and secondary chambers are separated by an elongated chamber wall 73. As shown in FIGS. 4 and 4A, the elongated chamber wall 73 includes an opening 75. The valve assembly 10' features angularly related inflow and outflow passages 54 and 56 formed within the housing 52 into which the pipe sections 14 and 16 respectively project in alignment with each other. A valve seat 58 is internally formed within the housing 52 in the conduit section 63, to which the inflow passage from the pipe section 14 extends at a lower end on one lateral side of the housing 52. The outflow passage 56 extends from the valve seat 58 on the other lateral side spaced above the inflow passage 54. A solid valve element 62 is positioned within an opening 60 in the conduit section 63 of the housing 52 above the valve seat 58. A valve stem 64 extends upwardly from the valve element 62 into an enclosure 66 fixed to housing 52, within which powered valve actuating means is enclosed including an electromagnetic valve driving coil 68 positioned on the valve stem 64. The enclosure 66 includes both the primary chamber and the secondary chamber, and as show in FIG. 4, the valve stem 64 and the valve driving coil 68 are located within the primary chamber. As shown, the valve stem is elongated in a direction that is substantially parallel to the direction of elongation of the chamber wall 73. A manual override actuator 70 is connected to the upper end of the valve stem 64 outside of the enclosure 66 for use as hereinbefore pointed out with respect to the override actuator 30.

With continued reference to FIG. 4, the powered actuator drive coil 68 is connected to a magnetic actuator 72 sealingly embedded within the enclosure 66 in the secondary chamber. The drive coil 68 is connected by the magnetic actuator 72 to an external electric power source 74 as another component of the electrically powered system through which valve operation is monitored and evaluated as hereinbefore pointed out with respect to the system 12. A sensor 76 within the enclosure 66 detects vertical movement of the valve element 62 and the valve stem 64 along its drive axis 71 by means of an arm 78 extending laterally therefrom into the sensor 76 which is connected to the actuator 72. As shown in FIGS. 4 and 4A, the sensor arm 78 extends from the primary chamber into the secondary chamber, via the opening 75. A current monitor 80 outside of the enclosure 66 is connected to the actuator 72 so as operate a valve position indicator 82 and an audible or visual alarm device 84 in response to detection of operational malfunction.

Figure 5:
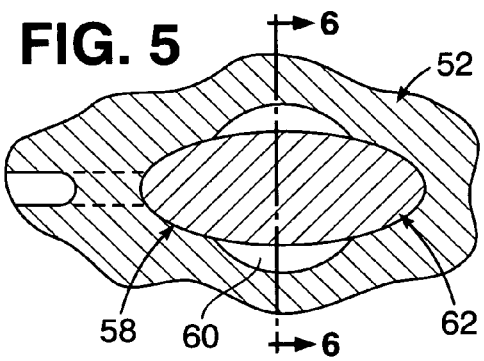
FIG. 5 is a partial section taken substantially through a plane indicated by section line 5-5 in FIG. 4A.
Figure 6:
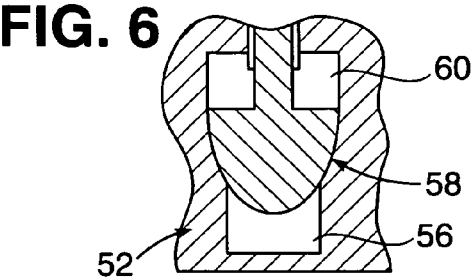
FIG. 6 is a partial section view taken substantially through a plane indicated by section line 6-6 in FIG. 5.

In FIG. 4 the valve element 62 is shown in a fully open position, while in FIGS. 4A, 5 and 6 the valve element 62 is shown in a fully closed position blocking flow between the inflow and outflow passages 54 and 56.

Obviously, other modifications and variations of the present invention may be possible in light of the foregoing teachings. It is therefore to be understood that within the scope of the appended claims the invention may be practiced otherwise than as specifically described.

What is claimed is:

1. A valve assembly comprising:
  a valve housing having:
    a conduit section through which an inlet pipe section and an outlet pipe section are connected in alignment with each other;
    a primary chamber; and
    a secondary chamber, wherein the primary chamber and the secondary chamber are separated by an elongated chamber wall, the elongated chamber wall having an opening at a lower end;
  an electrically powered actuator having a magnetic actuator and an actuator drive coil;
  a valve element seated within the housing in the conduit section between the pipe sections;
  a valve stem connected to the valve element, the valve stem disposed in the primary chamber of the housing and elongated in a direction substantially parallel to the direction of elongation of the elongated chamber wall, the actuator drive coil of the electrically powered actuator connected to the valve stem, the electrically powered actuator controlling the displacement of the valve element between a fully opened position and a fully closed position blocking fluid outflow from the outlet pipe section;
  a displacement sensing arm protruding from the valve stem and extending from the primary chamber into the secondary chamber through the opening at the lower end of the elongated chamber wall, the displacement sensing arm disposed entirely within the housing, wherein the displacement sensing arm translates within both the primary chamber and the secondary chamber of the valve housing in accordance with the displacement of the valve stem, the valve assembly further including:
    a sensor with a sensor opening both positioned within the secondary chamber of the valve housing, wherein the displacement sensing arm protrudes from the valve stem and extends into the sensor opening.

2. The valve assembly of claim 1, further including a current monitor outside the housing connected to the electrically powered actuator, and an alarm outside the housing connected to and responsive to the current monitor.

3. The valve assembly of claim 2, wherein the alarm is an audio or a visual alarm.

4. The valve assembly of claim 2, further including a manual override means connected to the valve stem.

5. The valve assembly of claim 2, wherein the magnetic actuator is located in the secondary chamber and the actuator drive coil is located in the primary chamber.

* * * * *